No. 830,728. PATENTED SEPT. 11, 1906.
W. C. LONGSTRETH.
MEANS TO CUT BUTTER OR LARD.
APPLICATION FILED FEB. 6, 1905.
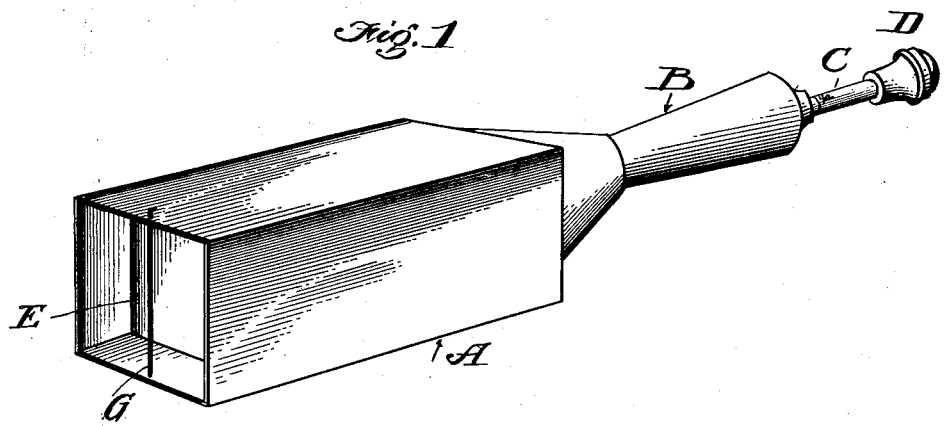
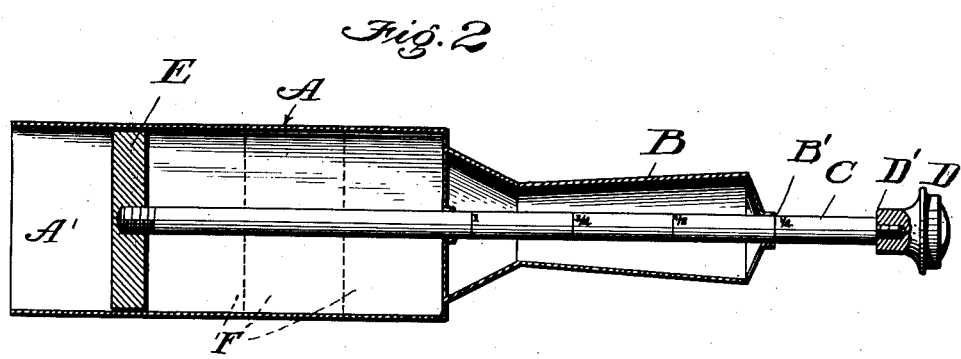
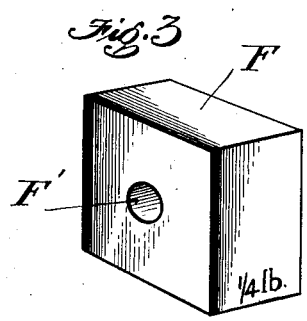
Witnesses
Inventor
William C. Longstreth
By Hazard & Warpham
Attorneys.

UNITED STATES PATENT OFFICE.

WILLIAM C. LONGSTRETH, OF LOS ANGELES, CALIFORNIA.

MEANS TO CUT BUTTER OR LARD.

No. 830,728.　　　Specification of Letters Patent.　　　Patented Sept. 11, 1906.

Application filed February 6, 1905. Serial No. 244,485.

*To all whom it may concern:*

Be it known that I, WILLIAM C. LONGSTRETH, a citizen of the United States, residing at Los Angeles, in the county of Los Angeles and State of California, have invented new and useful Improvements in Means to Cut Butter or Lard, of which the following is a specification.

The object of my invention is to provide a simple and reliable device whereby lard, butter, or other substance of like character may be cut into quarter, half pounds, or other quantities. I accomplish this object by means of the device described herein and shown in the accompanying drawings, in which—

Figure 1 is a perspective view of a lard and butter cutter device embodying my invention. Fig. 2 is a central longitudinal section of the same. Fig. 3 is a perspective view of one of the measuring-blocks for insertion in the cutter-case.

In the drawings, A represents a rectangular cutting-case made of tin or other suitable material open at one end and having attached to the other end thereof a conical-shaped handle B. Disposed in the center thereof is the graduated stem C, having graduation-marks placed thereon and carrying at its outer end a handle D, removably secured thereon. On the inner end of the stem is mounted the follower E, also detachably secured thereto. In this case I have shown both ends of the rod C screw-threaded for screw-threaded engagement with the handle at one end and the follower at the other for reasons which will be hereinafter explained.

In using my device the proper number of measuring-blocks F are placed upon the stem by unscrewing the stem from the follower E and placing thereon the necessary number of measuring-blocks F. These blocks are made of a size exactly large enough to occupy the same space required for a quarter-pound of butter, and having placed thereon a necessary number of measuring-blocks F to leave a space for the amount of butter required to be cut I screw the follower E onto the stem, when the device is ready for use. By placing the device over the lard or butter to be cut it is pressed down as far as it will go, the follower rising in the casing until the measuring-blocks stop the further movement thereof. The cutter is then removed, carrying with it the butter contained in the space below the follower. In Fig. 2 this space is shown at A' and will represent a quarter of a pound of butter. The cutter is then removed above the place where it is required to deposit the quarter-pound of butter. When the handle is pushed down as far as it will go, the ends D' will contact with the stop B' on the handle, at which time the follower will be flush with the open end of the casing, removing the quarter-pound of butter therefrom. These quarter-pound-measuring blocks may be lost or misplaced, and I have therefore shown on the stem C graduated marks to indicate a quantity of butter that will be cut when the follower is pressed up against the measuring-block or any substitute therefor. In case it is desired, for instance, to set the cutter so it will measure off half a pound of butter two measuring-blocks will be placed on the stem, that will permit the stem to be drawn out until the number "½" registers with the point B' on the handle, or washers or any substance may be placed on the stem that will limit the stroke of the plunger in the casing, so that the graduated mark "½" registers with the end B' of the handle. By this means the loss or displacement of the measuring-blocks will not prevent the desired adjustments of the cutter for cutting any desired quantity of lard or butter. The handle B on its exterior represents the frustum of a cone, the object of which is to prevent the handle from slipping out of the hand of the operator in withdrawing the cutter from the lard or butter being cut, the handle being more or less slippery, owing to the nature of the substance on which it is used. At the open end of the casing and in the center thereof I have provided a removable dividing-wire G, which will divide the substance being cut into halves.

Having described my invention, what I claim as new, and desire to secure by Letters Patent, is—

1. As an article of manufacture, a cutter for butter or lard, comprising a case, open at one end and closed at the other and provided in the closed end with a centrally-located orifice, a handle secured to the closed end of the case and provided with an orifice in line with the previously-mentioned orifice, a rod fitted to and sliding through said orifice, a follower removably secured to the rod and a measuring-block having a hole therethrough by which it may be mounted upon the rod and the latter may move freely therethrough whereby to form a stop for the plunger.

2. The combination with a case open at one end and closed at the other, and a cone-shaped handle secured to the closed end of the case, of a rod, having graduation-marks thereon, a plunger removably secured to one end of the rod and a measuring-block adapted to be mounted on the rod, and a rod adapted to slide freely therethrough whereby the block forms a stop for the plunger.

In witness that I claim the foregoing I have hereunto subscribed my name this 28th day of January, 1905.

W. C. LONGSTRETH.

Witnesses:
G. E. HARPHAM,
MARGARETE C. NICKELESON.